UNITED STATES PATENT OFFICE.

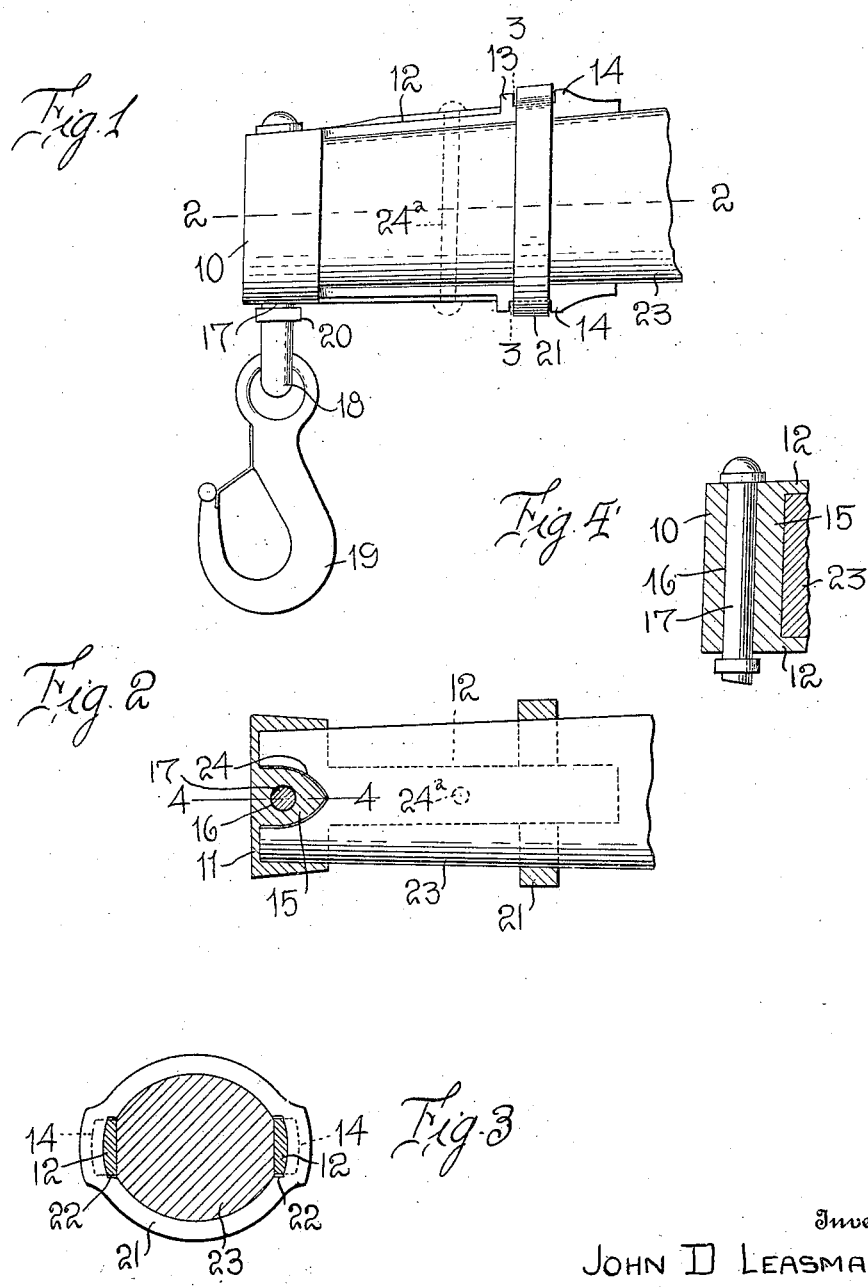

JOHN D. LEASMAN, OF STOCKDALE, TEXAS.

SWINGLETREE-CLIP.

1,236,951. Specification of Letters Patent. Patented Aug. 14, 1917.

Application filed January 30, 1917. Serial No. 145,360.

*To all whom it may concern:*

Be it known that I, JOHN D. LEASMAN, a citizen of the United States, residing at Stockdale, in the county of Wilson and State of Texas, have invented certain new and useful Improvements in Swingletree-Clips, of which the following is a specification, reference being had to the accompanying drawings.

This invention relates to swingletrees and particularly to means for capping the end of the swingletree and connecting the trace hook thereto.

The general object of my invention is to provide an improved form of swingletree clip which is simple in construction, may be cheaply made and in which the eye which connects the hook to the clip is swiveled so that the hook may rotate and thus there will be no chance of disengagement between the draft connections and the swingletree.

A further object of the invention is to provide means whereby the swingletree clip may be held from rotation upon the swingletree and another object is to provide means for clamping the clip on the swingletree.

Other objects will appear in the course of the following description.

My invention is illustrated in the accompanying drawings, wherein—

Figure 1 is a side elevation of a portion of a swingletree with my improved swingletree clip mounted thereon;

Fig. 2 is a section on the line 2—2 of Fig. 1;

Fig. 3 is a section on the line 3—3 of Fig. 1;

Fig. 4 is a fragmentary vertical section on the line 4—4 of Fig. 2.

Referring to these drawings, it will be seen that my improved clip comprises an annular cap 10 closed at one end by a wall 11 and open at the opposite end. Extending from this cap are the oppositely disposed clamping legs 12 which are transversely rounded and provided adjacent their ends with the transversely extending lugs 13 and 14 defining a groove between the lugs. The face of the lug 14 is beveled down toward the end of the leg. Extending transversely across the interior of the cap 10 and integral with the cap and the legs is a triangular member or web 15 bored as at 16 for the passage of the shank 17 or an eye 18 by which the snap hook 19 is connected to the clip. The shank 17 is freely rotatable within the passage 16 and the shank is provided with an overturned head 19 at one end and with a flange 20 at the base of the eye 18, thus preventing the shank or the eye from binding on the clip. Adapted to surround and clampingly engage the leg 12 is a somewhat elliptical band or ring 21 having recessed portions 22 at diametrically opposite points. These recessed portions engage in the grooves defined between the lugs 13 and 14 as will be best seen in Fig. 1.

The swingletree 23 is of the usual form, semi-oval or elliptical in transverse section, and having its extremity cut away as at 24 to receive and fit the triangular web 15. Thus when the clip is in place upon the end of the swingletree, it cannot rotate but is held firmly in proper position, the band 21 causing the legs 12 to clamp firmly against the wood of the swingletree. The advantages of my invention will be obvious to those skilled in the art as will its practical use.

While I have referred to the clips 12 as being forced into the wood of the swingletree by the device being driven in position, it is obvious that it may be held in position by a transversely extending rivet 24, illustrated in dotted lines in Fig. 1, or a small bolt may be used in place of the rivet. It will be seen that by my invention the end of the swingletree is protected by the cap 10 and that the swiveled engagement of the shank 17 with this cap keeps the trace straight so that whenever the trace is hooked on, it will not come loose until intentionally detached.

Having described my invention, what I claim is:

1. A swingletree clip including a cap having an end wall and a side wall, the cap entirely covering the end of the swingletree, a transversely extending web across the interior of the cap, and an eye having a shank extending through said web and rotatably mounted therein.

2. A swingletree clip including an annular cap having rearwardly extending clamping legs, a web extending diametrically across the cap and having a longitudinally extending bore, a shank rotatably mounted in the web and formed with an eye, a hook attached to the shank, and a clamping ring engaging said legs.

In testimony whereof I hereunto affix my signature in the presence of two witnesses.

JOHN D. LEASMAN.

Witnesses:
ELLEN WEBER,
EFFIE WILLIAMS.

Copies of this patent may be obtained for five cents each, by addressing the "Commissioner of Patents. Washington, D. C."